(12) United States Patent
Mizumura et al.

(10) Patent No.: US 7,771,119 B2
(45) Date of Patent: Aug. 10, 2010

(54) LINEAR GUIDE APPARATUS

(75) Inventors: Yoshinori Mizumura, Fujisawa (JP);
Keisuke Matsumura, Fujisawa (JP)

(73) Assignee: NSK Ltd., Tokyo (JP)

( * ) Notice: Subject to any disclaimer, the term of this patent is extended or adjusted under 35 U.S.C. 154(b) by 466 days.

(21) Appl. No.: 11/926,195

(22) Filed: Oct. 29, 2007

(65) Prior Publication Data

US 2008/0124011 A1 May 29, 2008

(30) Foreign Application Priority Data

Nov. 27, 2006 (JP) .............................. 2006-318177

(51) Int. Cl.
*F16C 29/04* (2006.01)
(52) U.S. Cl. ...................................................... 384/45
(58) Field of Classification Search .............. 384/43–45
See application file for complete search history.

(56) References Cited

U.S. PATENT DOCUMENTS

| | | | | |
|---|---|---|---|---|
| 4,634,295 | A * | 1/1987 | Agari ............................ | 384/44 |
| 7,401,978 | B2 * | 7/2008 | Nakano et al. ................. | 384/45 |
| 7,645,072 | B2 * | 1/2010 | Shimizu ........................ | 384/44 |
| 7,677,804 | B2 * | 3/2010 | Geka et al. ..................... | 384/45 |
| 2005/0213856 | A1 * | 9/2005 | Geka et al. ..................... | 384/45 |
| 2006/0034552 | A1 * | 2/2006 | Nakano ........................ | 384/45 |

FOREIGN PATENT DOCUMENTS

| | | |
|---|---|---|
| JP | 2002-155936 A | 5/2002 |
| JP | 2003-35314 A | 2/2003 |
| JP | 2005-273765 A | 10/2005 |
| JP | 2005-337455 A | 12/2005 |
| JP | 2006-29384 A | 2/2006 |
| WO | 2005/019668 A1 | 3/2005 |
| WO | 2005/108807 A1 | 11/2005 |

OTHER PUBLICATIONS

Chinese Office Action dated Apr. 10, 2009.

* cited by examiner

*Primary Examiner*—Thomas R Hannon
(74) *Attorney, Agent, or Firm*—Sughrue Mion, PLLC

(57) ABSTRACT

Inclined portions 15 which are provided at both end portions of a slider-side rolling element raceway groove 11 are each made up of a first crowning 18 which is formed into a curved surface shape with a large radius of curvature so as to be inclined moderately and continuously from the slider-side rolling element raceway groove, a planar second crowning 19 which neighbors the first crowning and extends towards an inner circumferential surface of a direction turning path and which is steeper in inclination than the first crowning and shorter in axial length than the first crowning, and a slope 20 which is provided between the second crowning and an end face of a slider main body and is formed steeper than the first and second crownings.

8 Claims, 4 Drawing Sheets

LINEAR GUIDE APPARATUS

BACKGROUND OF THE INVENTION

1. Field of the Invention

The present invention relates to a linear guide apparatus in which inclined portions are formed at both end portions of a slider-side rolling element raceway groove which makes up a rolling element rolling path.

2. Description of Related Art

A linear guide apparatus in which a guided body is guided in a straight line while infinitely circulating rolling elements such as rollers or balls is one of important mechanical elements which affect largely a kinetic accuracy of semiconductor manufacturing systems, ultra-precision machine tools and ultra-precision measuring equipment.

The linear guide apparatus is an apparatus which includes a guide rail having a rail-side rolling element raceway groove provided thereon and a slider main body having a slider-side rolling element raceway groove provided thereon so as to face the rail-side rolling element raceway groove and supported on the guide rail so as to move in axial directions by virtue of rolling of a plurality of rolling elements which are provided within a rolling element rolling path which is formed between the slider-side rolling element raceway groove and the rail-side rolling element raceway groove. This apparatus includes a rolling element return path which is provided within the slider main body so as to extend parallel to the rolling element rolling path and direction turning paths which are provided in end caps mounted at both end portions of the slider main body in moving directions thereof so as to each establish a communication between the rolling element rolling path and the rolling element return path.

When the rolling elements of the linear guide apparatus are endlessly circulated along the rolling element rolling path, the direction turning paths and the rolling element return path, periodic minute vibrations (hereinafter, referred to as rolling element passing vibrations) are generated, whereby the kinetic accuracies of the aforesaid system, machine and equipment are largely affected. The rolling element passing vibrations are caused to appear when the rolling elements which roll in the rolling element rolling path (loaded area) while being loaded by a pre-load or external load roll out of the loaded area to the rolling element circulation path (unloaded area), whereby the load on the rolling elements is released or, on the contrary, when the rolling elements enter the loaded area from the unloaded area, whereby load is applied again to the rolling elements.

In order to suppress the rolling element passing vibrations, slopes referred to as crownings are provided at both end portions of the slider-side rolling element raceway groove which makes up the rolling element rolling path so as to make a change in load which happens as the rolling elements enter and emerge from the rolling element into and out of the loaded area occur gradually, thereby making it possible to reduce rolling element passing vibrations.

Here are two types of linear guide apparatuses; a linear guide apparatus in which only crownings are formed at both end portions of a slider-side rolling element raceway groove, and a linear guide apparatus in which crownings and chamfers are both formed at both end portions of a slider-side rolling element raceway groove.

As an example of the linear guide apparatus in which only the crownings are formed at both end portions of the slider-side rolling element raceway groove, there is a linear guide apparatus in which only crownings which are each made up of a less steeply inclined slope which extends into a single arc-like shape while neighboring a slider-side rolling element raceway groove and a steeply inclined slope which extends into a straight line while neighboring the slope so as to suppress the reduction in rigidity, thereby making it possible to suppress the amplitude of rolling element passing vibrations to as small a value as possible (for example, Japanese Patent Unexamined Publication No. JP-A-2005-337455).

In addition, as another example of the linear guide apparatus in which only the crownings are formed at both end portions of the slider-side rolling element raceway groove, there is a linear guide apparatus in which a crowning is configured into a curve such as a power function curve, a curve made up of a plurality of curves and a least square method curve, and in which rigidity relative to any one direction of a perpendicular direction (vertical direction), a horizontal direction and a rolling direction of the slider main body is held substantially constant and rigidity relative to either or both of a pitching direction and a yawing direction of the slider main body is held substantially constant (for example, Japanese Patent Unexamined Publication No. JP-A-2003-035314).

On the other hand, as the linear guide apparatus in which crownings and chamfers are both formed at both end portions of the slider-side rolling element raceway groove, there exist a linear guide apparatus in which a linearly extending crowning and a chamfer, which extends in a straight line between the crowning and an end face of a slider main body, are formed (for example, Japanese Patent Unexamined Publication No. JP-A-2005-273765) and a linear guide apparatus in which a curvedly extending crowning and a round-shaped (or rounded) chamfer, which is formed between the crowning and an end face of a slider main body, are formed to thereby suppress not only the occurrence of element passing vibrations but also the reduction in rigidity, so as not only to enhance the durability of end caps when the linear guide apparatus is driven at high speeds but also to reduce the level of noise and vibration (for example, Japanese Patent Unexamined Publication No. JP-A-2006-029384 and PCT Application Publication No WO2005/019668) Here, the crowning of JP-A-2006-029384 includes a curved effective crowing portion which continues from a rolling surface of a rolling element rolling path and a curved out-of-effect crowning portion which continues to the effective crowning portion, and a crowning depth of the effective crowning portion is of the order of an elastic deformation amount of a rolling element that is generated when a pre-load is applied.

Furthermore, as another example of the linear guide apparatus in which crownings and chamfers are both formed at both end portions of the slider-side rolling element raceway groove, there exists a linear guide apparatus in which crownings are formed at both ends of a loaded area relative to a loaded rolling surface, and stepped portions of the order of 5% of a diameter of a rolling element are formed at edge portions of the loaded rolling surface so as to be lower than an inside diameter-side side wall surface of a direction turning path (for example, Japanese Patent Unexamined Publication No. JP-A-2002-155936).

However, in the above five Japanese Patent Unexamined Publications and PCT publication, which have been described above, have the following inherent problems.

In the JP-A-2005-337455, when the diameter of a rolling element is 4 mm, a maximum depth of the crowning, which is made up of the slope which extends into the single arc-like shape and the slope which extends in the straight line, is set to be on the order of 20 μm. In general, when the diameter of the rolling element is 4 mm, the direction turning path has a clearance of the order of 0.1 to 0.4 mm relative to the rolling elements for easy circulation thereof, and a stepped portion is generated by a difference in level of the order of 0.05 to 0.2 mm, corresponding to a half of the clearance, which is generated between the rolling surface of the rolling element rolling path and a guide surface of the direction turning path. Even though the maximum depth of the crowing is 20 μm, the difference in level is generated between the rolling surface of the rolling element rolling path and the guide surface of the direction turning path, and when the linear guide apparatus is driven at high speeds, the rolling elements are brought into collision with the stepped portions, causing a fear that damage such as peeling is caused to occur at the end portions of the rolling element rolling path in an early stage of the life of the linear guide apparatus.

In addition, in the JP-A-2003-035314, (estimating from FIGS. 7 and 13 thereof) the maximum depth of the crowning is a small value in the range of 10 μm to 20 μm, and as in the case of the JP-A-2005-337455, when the linear guide apparatus is driven at high speeds, the rolling elements are brought into collision with stepped portions, which are caused by similar differences in level, causing a fear that damage such as peeling is caused to occur at the end portions of the rolling element rolling path in an early stage of the life of the linear guide apparatus.

Additionally, in the JP-A-2005-273765, the round-shaped chamfer formed between the crowning and the end face of the slider main body protrudes further than the guide surface of the direction turning path, so as to intentionally bring the rolling elements into collision with the round-shaped chamfer. However, since this round-shaped chamfer has to have a radius of curvature of 0.1 mm or greater and be formed into a mirror surface configuration, ultra-precision grinding work is required, causing a problem with working costs. In addition, the crownings and the round-shaped chamfers are machined in separate steps. Therefore, a tremendous amount of labor hours need to be spent inspecting to confirm that a boundary portion between the crowning and the round-shaped chamfer is formed into a shape made up of a curved surface and having no angled portion and has a radius of curvature of 0.1 mm or greater.

In addition, in the JP-A-2006-029384, when the linear guide apparatus is driven at high speeds, when entering the rolling element rolling path which is the loaded area from the direction turning path, the rolling elements are brought into collision with the out-of-effect crowning portion which continues to the effective crowning portion to thereby generate stress Since the out-of-effect crowning portion is formed into the curved shape, although the stress is mitigated, compared to a sharp edge or a minute round shape, since the rolling elements and the out-of-effect crowning portion are both made up of convex surfaces, the effect of stress mitigation is reduced.

Furthermore, in the WO2005/019668, the axial length of the round-shaped chamfer is increased to increase the radius of curvature thereof, so as to mitigate stress generated by the collision of the rolling elements. However, adopting this configuration decreases an area where the inner circumferential guide member which makes up the inner circumferential guide surface of the direction turning path and the end face of the slider main body, whereby a recess portion is formed between the inner circumferential surface of the inner circumferential guide member and the chamfer, and depending on the posture of the mounted linear guide apparatus, there is caused a fear that the rolling elements fall in the recess portion to thereby interrupt a smooth rolling operation thereof.

Moreover, in the JP-A-2002-155936, since the stepped portion is formed in such a manner that the edge portion of the loaded rolling surface becomes lower than the inside diameter-side side wall surface of the direction turning path, when the rolling elements roll into the direction turning path from the rolling element rolling path, the stepped portion interrupts the circulation of the rolling elements, causing a fear that the rolling elements are prevented from smooth rolling operation. Because of this, the molding accuracy of components and machining accuracy of the slider main body need to be enhanced, and this increases the number of steps including inspections, causing a problem that the productivity is deteriorated.

SUMMARY OF THE INVENTION

Then, the invention has been made in view of the unsolved problems inherent in the conventional examples, and an object thereof is to provide a linear guide apparatus which can enhance the durability thereof when it is driven at high speeds without deteriorating the productivity and can suppress the reduction in load-carrying capacity and rigidity without deteriorating rolling element passing vibrations.

With a view to attaining the object, according to a first aspect of the invention, there is provided a linear guide apparatus including:

a guide rail including a rail-side rolling element raceway groove which is formed thereon so as to extend along an axial direction of the guide rail;

a slider main body including a slider-side rolling element raceway groove which faces the rail-side rolling element raceway groove;

a plurality of rolling elements provided within a rolling element rolling path which is made up of the rail-side rolling element raceway groove and the slider-side rolling element raceway groove so that the slider main body is movably supported on the guide rail;

a rolling element return path provided within the slider main body so as to extend parallel to the rolling element rolling path;

end caps mounted, respectively, on both end faces of the slider main body in moving direction of the slider main body;

direction turning paths formed by inner circumferential guide members which are disposed to be fixed, respectively, to the end faces of the slider main body so as to establish a communication between the rolling element rolling path and the rolling element return path; and inclined portions provided at both end portions of the slider-side rolling element raceway groove, wherein the inclined portions are each includes:

a curved first crowning which is formed to a large radius of curvature so as to be inclined moderately and continuously from the slider-side rolling element raceway groove;

a straight-line second crowning which neighbors the first crowning and extends towards an inner circumferential surface of the direction turning path and which is steeper in inclination than the first crowning and shorter in axial length than the first crowning; and a slope which is provided between the second crowning and the end face of the slider main body and is formed steeper than the first and second crownings, and in a section taken along a direction in which the inclined portions and the rolling elements are brought into contact with each other, an intersection point between an imaginary line extending linearly along the second crowning and a linear imaginary line extending along the end face of the slider main body substantially coincides with an intersection point between an imaginary line extending in an arc-like fashion along an outer circumference of the inner circumferential guide member which makes up an inner circumferential surface of the direction turning path and the linear imaginary line extending along the end face of the slider main body.

According to a second aspect of the invention, there is provided a linear guide apparatus as set forth in the first aspect of the invention, wherein the slope is formed so as to be rounded.

According to a third aspect of the invention, there is provided a linear guide apparatus as set forth in the first aspect of the invention, wherein a boundary portion between the second crowning and the slope is formed so as to be rounded.

According to a fourth aspect of the invention, there is provided a linear guide apparatus as set forth in the first aspect of the invention, wherein a boundary portion between the first crowning and the second crowning is formed so as to be rounded.

According to a fifth aspect of the invention, there is provided a linear guide apparatus including:

a guide rail including a rail-side rolling element raceway groove which is formed thereon so as to extend along an axial direction of the guide rail;

a slider main body including a slider-side rolling element raceway groove which faces the rail-side rolling element raceway groove;

end caps mounted on both ends of the slider main body in moving direction thereof;

inner circumferential guide members mounted on both ends of the slider main body in moving direction thereof within the end caps, respectively; and a plurality of rolling element which circulate in a rolling path including:

a rolling element rolling path formed by the rail-side rolling element raceway groove and the slider-side rolling element raceway groove;

a rolling element return path formed within the slider main body so as to extend parallel to the rolling element rolling path; and direction turning paths formed by the end caps and the inner circumferential guide members so as to communicate the rolling element rolling path with rolling element return path, wherein the slider-side rolling element raceway groove includes inclined portions at both end portions thereof, the each inclined portions includes:

a curved first crowning which is continuous from the slider-side rolling element raceway groove in a curved fashion;

a straight-line second crowning which extends towards an inner circumferential surface of the direction turning path from the first crowning and has an inclination angle larger than a maximum inclination angle of the first crowing and shorter in axial length than the first crowning; and a slope which is provided between the second crowning and the end face of the slider main body and of which inclination angle is larger than those of the first and second crownings, and in a section taken along a direction in which the inclined portions and the rolling elements are brought into contact with each other, an intersection point between an imaginary line extending linearly along the second crowning and a linear imaginary line extending along the end face of the slider main body substantially coincides with an intersection point between an imaginary line extending in an arc-like fashion along an outer circumference of the inner circumferential guide member which makes up an inner circumferential surface of the direction turning path and the linear imaginary line extending along the end face of the slider main body.

According to the linear guide apparatus of the invention, the linear guide apparatus can be provided which can enhance the durability thereof when it is driven at high speeds without deteriorating the productivity and can suppress the reduction in load-carrying capacity and rigidity without deteriorating rolling element passing vibrations.

DETAILED DESCRIPTION OF THE PREFERRED EMBODIMENTS

Hereinafter, a best mode for carrying out the invention (hereinafter, referred to as an embodiment) will be described in detail by reference to the accompanying drawings.

Figure 1:
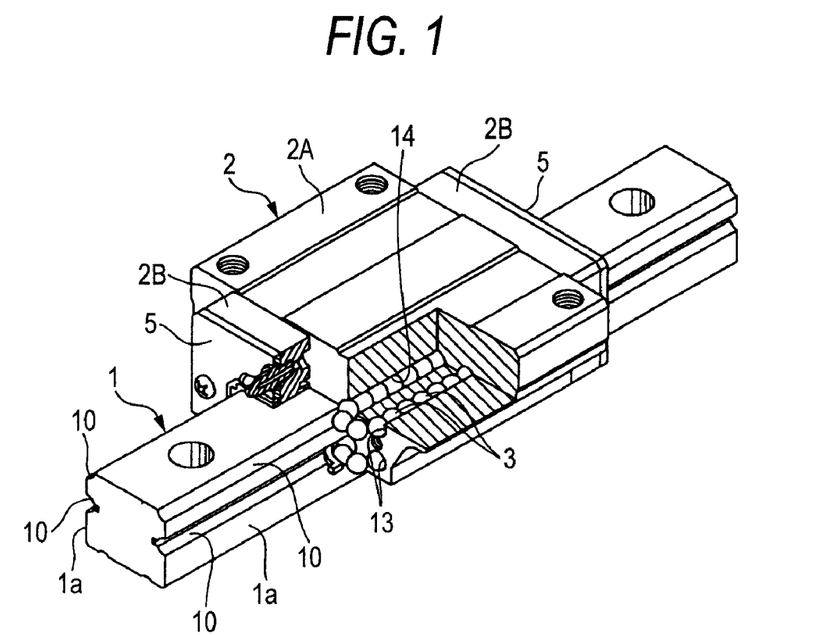
FIG. 1 is a perspective view showing a linear guide apparatus according to the invention.
Figure 2:
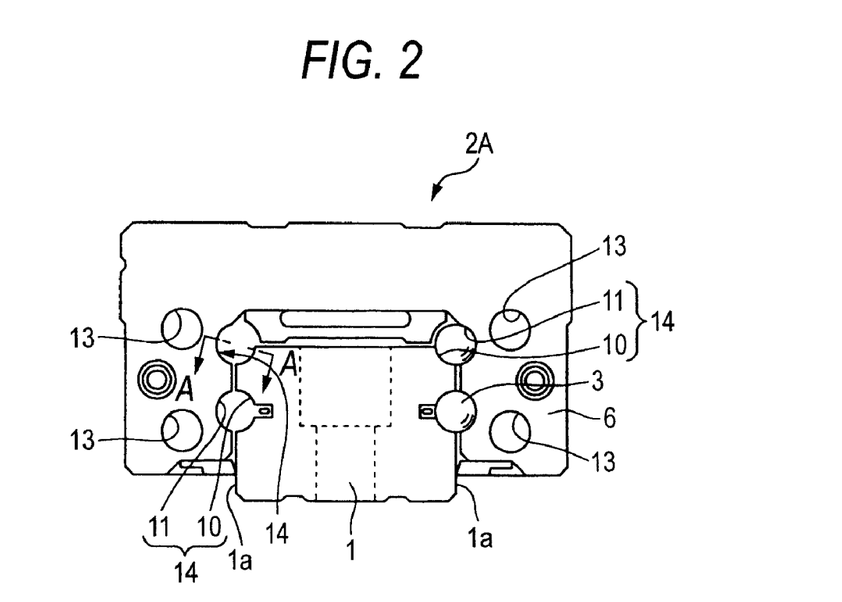
FIG. 2 is a plan view showing a slider main body which is a constituent member of the linear guide apparatus.
Figure 3:
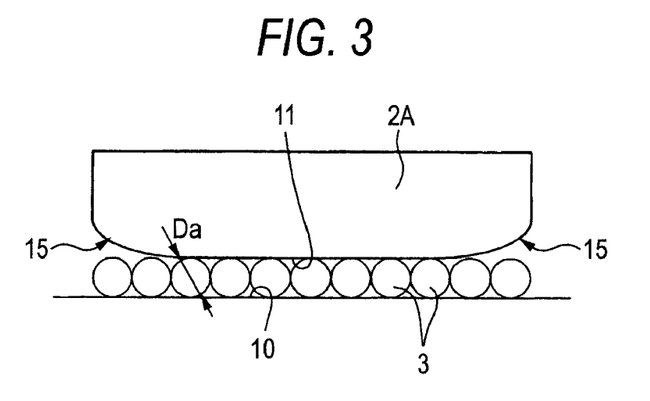
FIG. 3 is a view as seen in a direction indicated by arrows A in FIG. 2.

Firstly, FIG. 1 shows an external appearance of a linear guide apparatus according to the invention. In addition, FIG. 2 shows an inner construction of a slider main body of the linear guide apparatus. Additionally, FIG. 3 is a view as seen in a direction indicated by arrows A in FIG. 2.

As is shown in FIG. 1, a linear guide apparatus has a guide rail 1 and a gate-shaped slider 2 which is built on the guide rail 1 so as to move therealong. A rolling element raceway groove 10 (rail-side rolling element groove), which is made up of a recess groove extending axially and formed into an arc-like shape of one-fourth of a circle, is formed in each of ridge portions where an upper surface of the guide rail 1 intersects side surfaces 1a thereof. In addition, a rolling element raceway groove 10, which is made up of a recess groove extending axially and having a substantially semi-circular cross section, is also formed in an intermediate position on each of both the side surfaces 1a of the guide rail 1.

The slider 2 is made up of a slider main body 2A and gate-shaped end caps 2B which are detachably attached to both axial end portions of the slider main body 2A. Furthermore, a side seal 5 is mounted on an end face of each of the end caps 2B so as to cover an opening formed by a gap between the guide rail 1 and the slider 2 in a sealed fashion.

As is shown in FIG. 2, a rolling element raceway groove (the slider-side rolling element raceway groove) 11 having a semi-circular cross section is formed in a corner portion on an internal side of each of arm portions 6 of the slider main body 2A so as to face the rolling element raceway groove 10 on the guide rail 1.

Then, four rolling element rolling paths 14 are formed by the rolling element raceway grooves 10 on the guide rail 1 and the rolling element raceway grooves 11 on both the arm portions 6 of the slider main body 2A, and these rolling element rolling paths 14 extend in the axial direction. In addition, the slider 2 includes rolling element return paths 13 which are made up, respectively, of circular through holes which pass axially through thick portions of the arm portions 6 of the slider main body 2 in upper and lower portions thereof in parallel with the rolling element rolling paths 14, respectively.

The end cap 2B has direction turning paths which cause the rolling element rolling paths 14 to communicate with the rolling element return paths 13, respectively. This direction turning path is made to allow rolling elements 3 to be sent from a terminating point of the rolling element rolling path 14 to an initiating point of the rolling element return path 13 or from a terminating point of the rolling element return path 13 to an initiating point of the rolling element rolling path 14.

FIG. 3 is a conceptual view taken along the line A-A and seen in the direction indicated by the arrows relative to a direction of a contact angle between the rolling element raceway grooves 10, 11 which makeup the rolling element rolling path 14, inclined portions 15 are provided at both end portions of the slider main body 2A.

First Embodiment

Figure 4:
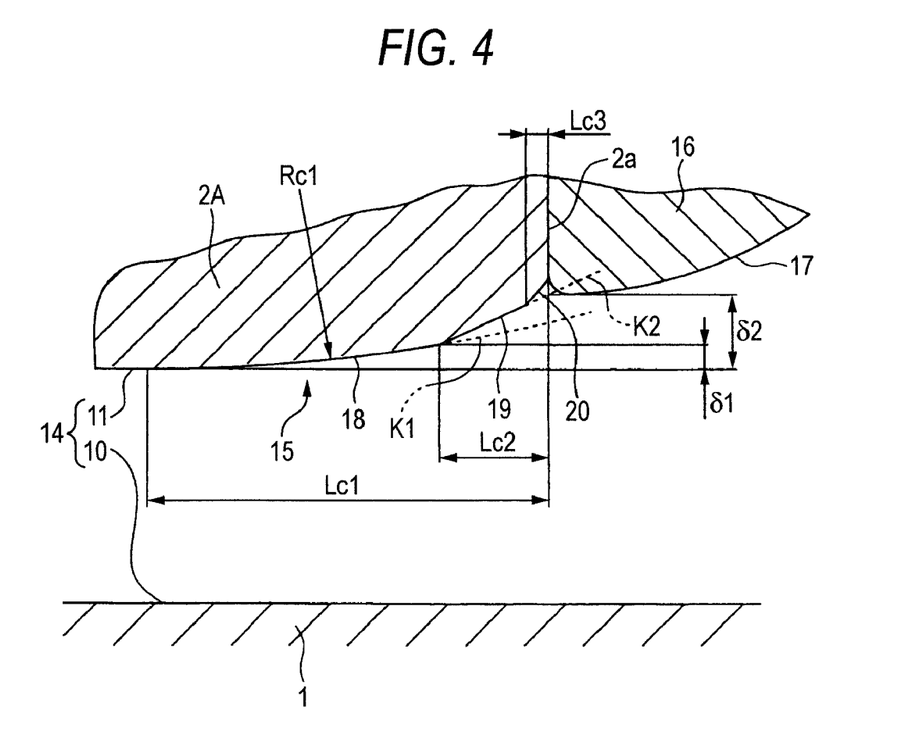
FIG. 4 is a sectional view showing a shape of an inclined portion of a first embodiment according to the invention.
Figure 5:
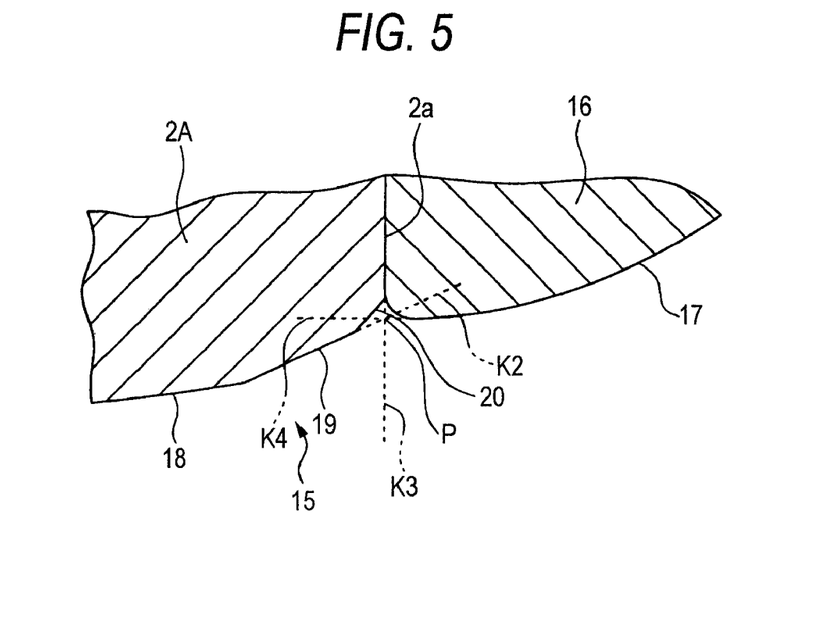
FIG. 5 is a sectional view showing a shape of a main portion of the inclined portion of the first embodiment.

FIGS. 4 and 5 show an inclined portion 15 of a first embodiment according to the invention in an enlarged fashion. Although the inclined portion 15 is actually an extremely minute portion and has dimensions which make it difficult for the inclined portion 15 to be visible to the naked eyes, the inclined portion 15 is shown in an exaggerated fashion for the sake of understandable explanation.

In these figures, reference numeral 16 denotes a return guide (the inner circumferential guide member) interposed between the slider main body 2A and the end cap 2B, and an inner circumferential side circulation groove 17, which extends into a semi-circular arc-like shape, is formed on an outer circumference of the return guide 16. This inner circumferential side circulation groove 17 and an outer circumferential side circulation groove (not shown), which is formed on the end cap 2B so as to face the inner circumferential side circulation groove 17, make up the direction turning path which causes the rolling element rolling path 14 to communicate with the rolling element return path 13.

The inclined portion 15 of this embodiment includes a curved first crowning 18 which continues from the rolling element raceway groove 11, a second crowning 19 (second crowning) which neighbors the first crowning 18 and extends in a straight line towards an end face 2a of the slider main body 2A and a slope 20 which extends in a straight line between the second crowning 19 and the end face 2a of the slider main body 2A.

The first crowning 18 is formed into a curved line with a large radius of curvature Rc1 so as to be inclined moderately.

The second crowning 19 is formed so as to be inclined further in a direction in which it moves away from the rolling element raceway groove 10 on the guide rail 1 which it faces than a first imaginary line (a line indicated by a broken line which extends along the first crowning 18 in FIG. 4) K1 of the first crowning 18.

The slope 20 is formed into a straight-line shape which is inclined further in a direction in which it moves away from the rolling element raceway groove 10 on the guide rail 1 which it faces than a second imaginary line (a line indicated by a broken line) K2 (the imaginary line which is extending in a straight line along the second crowning) which extends in a straight line along the second crowning 19

In addition, as is shown in FIG. 5, a intersection point between a third imaginary line (a line indicated by a broken line) K3 (the linear imaginary line which is extending along the end face of the slider main body) which extends along the end face 2a of the slider main body 2A and the second imaginary line K2 is formed so as to substantially coincide with a intersection point between a fourth imaginary line K4 (the imaginary line which is extending along the outer circumference of the inner circumferential guide member which makes up the inner circumferential surface of the direction turning path) which extends along the inner circumferential side circulation groove 17 of the return guide 16 and the third imaginary line K3 (a position indicated by reference character P in FIG. 5). Namely, in a section in a direction in which the inclined portion 15 contacts the rolling elements 3, the second crowning 19 is provided so as to be substantially level with an inner circumferential surface of the direction turning path which is made up of the inner circumferential side circulation groove 17 of the return guide 16.

In this embodiment, a maximum depth δ1 of the first crowning 18 is set to be on the order of 0.3% of a diameter Da (refer to FIG. 3) of the rolling elements 3 which corresponds to a pre-load amount of the linear guide apparatus of the embodiment, and a maximum depth δ2 of the second crowning 19 is set to be on the order of 1.5% of the diameter Da of the rolling elements 3.

In addition, a crowning length Lc1 of the first crowning 18 is set to be substantially 1.9 times the diameter Da of the rolling elements 3, and a crowning length Lc2 of the second crowning 19 is set to be substantially 0.5 times the diameter Da of the rolling elements 3. In addition, the slope 20 is inclined substantially at 45° relative to the rolling element raceway groove 11 of the slider main body 2A, and a length Lc3 thereof is set to be on the order of 0.05 to 0.3 mm.

Note that it is desirable from conditions in which the linear guide apparatus is used and other internal design conditions thereof that the maximum depth δ1 of the first crowning 18 is made to be in the range of 0.1 to 0.5% of the diameter Da of the rolling elements 3, the maximum depth δ2 of the second crowning 19 is made to be in the range of 0.7 to 4.0% of the diameter Da of the rolling elements 3, the length of the first crowning 18 is in the range of 1.5 to 4.0 times the diameter Da of the rolling elements 3, and the inclination angle of the second crowning 19 is made to be less than 5° relative to the rolling element raceway groove 11 of the slider main body 2A.

According to this embodiment, since the first crowning 18 is formed into the curved surface shape with the large radius of curvature Rc1 so as to be inclined moderately is formed on each of the inclined portions 15 provided at both the end portions of the slider main body 2A so as to continue from the rolling element raceway groove 11, rolling element passing vibrations are reduced.

In addition, since the straight-line second crowning 19 is also provided on each of the inclined portions 15 which neighbors the first crowning 18 and which is inclined steeper than the first crowning 18 and is made shorter in axial length than the first crowning 18, the rolling elements 3 can be made to roll smoothly while suppressing the axial length, when compared to the conventional linear guide apparatus in which the single linear crowning and the single curvilinear crowning are formed on each of the end portions of the slider main body 2A. Therefore, a drastic change in load on the rolling elements 3 which pass through the inclined portions 15 is absorbed so as to suppress the reduction in rigidity and load-carrying capacity.

In addition, although the second crowning 19 makes up a colliding surface for the rolling elements 3 which roll towards the inclined portions 15 from the direction turning paths when the linear guide apparatus is driven at high speeds, the second crowning 19 is not formed into the edge shape or the protruding shape as in the case of the conventional linear guide apparatus but is formed into the straight-line shape, whereby since stress generated in the rolling elements 3 and the second crowning 19 when the former is brought into collision with the latter is reduced, compared to the conventional linear guide apparatus, the durability of the linear guide apparatus when it is driven at high speeds is enhanced. Here, with a view to reducing the stress, the second crowning 19 may be formed into a concave or recess shape.

In addition, since the second crowning 19 is formed so as to be substantially level with the inner circumferential surface of the direction turning path (the inner circumferential side circulation groove 17 of the return guide 16) as viewed in the section in the direction in which the inclined portions 15 contact the rolling elements 3, even when the rolling elements 3 are circulated from the direction turning path to the inclined portion 15 side or from the inclined portion 15 side towards the direction turning path, the rolling elements 3 are allowed to roll smoothly.

Additionally, because the slope 20 is provided between the second crowning 19 and the end face 2a of the slider main body 2A, influences from manufacturing or molding tolerances of components and assembling tolerances of the components can be absorbed by the slope 20, and this reduces the number of manufacturing steps including inspections, thereby making it possible to increase the productivity. In addition, although the difference in level is caused between the end face 2a of the slider main body 2A and the return guide 16, the amount of difference in level can be reduced to one-half of that of the case where the difference in level is intentionally provided on the end face 2a of the slider main body 2A and one side of the return guide with the same component accuracy and assembling accuracy.

Consequently, according to this embodiment, the inclined portions 15 are each made up of the curved first crowning 18 which is formed to the large radius of curvature Rc1 so as to be inclined moderately and continuously from the slider-side rolling element raceway groove 11, the straight-line second crowning 19 which neighbors the first crowning 18 and extends towards the inner circumferential surface of the direction turning path (the inner circumferential side circulation groove 17 of the return guide 16) and which is steeper in inclination than the first crowning 18 and shorter in axial length than the first crowning 18, and the slope 20 which is provided between the second crowning 19 and the end face 2a of the slider main body 2A and is formed steeper than the first and second crownings 18, 19. Further, in the section taken along the direction in which the inclined portions 15 and the rolling elements 3 are brought into contact with each other, the intersection point between the imaginary line K1 extending linearly along the second crowning 19 and the linear imaginary line K3 extending along the end face 2a of the slider main body 2A substantially coincides with the intersection point between the imaginary line K4 extending along the inner circumferential side circulation groove 17 of the return guide 16 and the linear imaginary line K3 extending along the end face 2a of the slider main body 2A. Therefore, the linear guide apparatus can be provided which not only enhances the durability thereof when it is driven at high speeds without reducing the productivity but also suppresses the reduction in load-carrying capacity and rigidity without deteriorating the rolling element passing vibrations.

Second Embodiment

Figure 6:
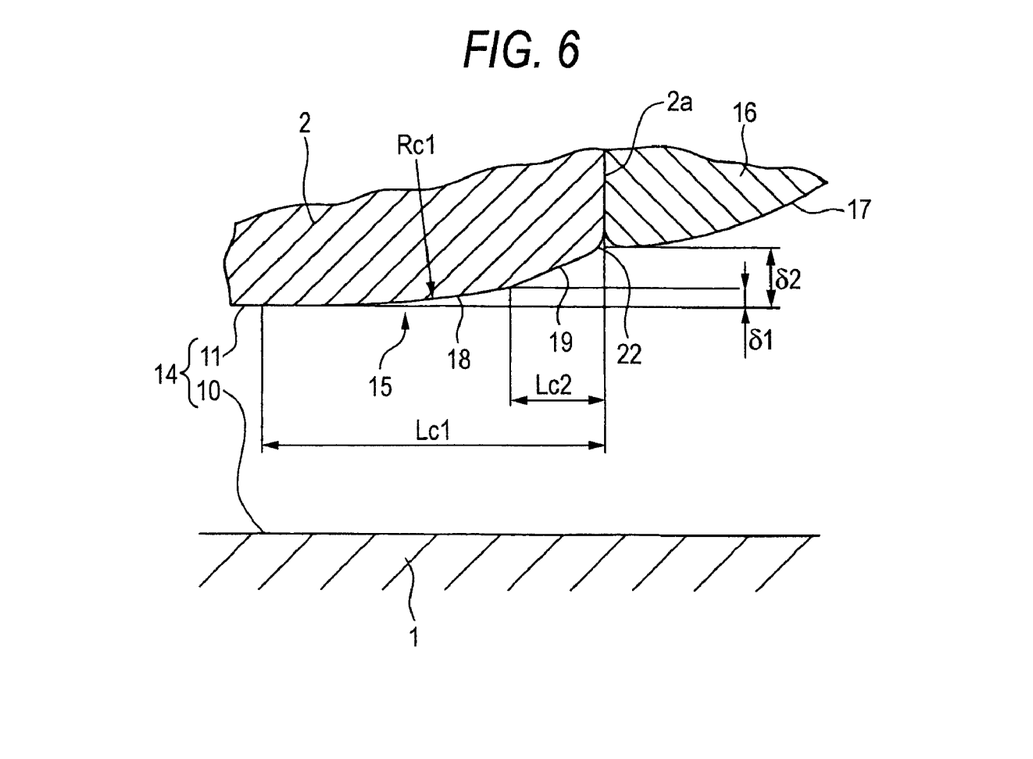
FIG. 6 is a sectional view showing a shape of an inclined portion of a second embodiment according to the invention.

Next, FIG. 6 shows an inclined portion 15 of a second embodiment according to the invention in an enlarged fashion. Note that like reference numerals are given to like configurations to those of the first embodiment shown in FIGS. 1 to 5, so as to omit the repetition of similar descriptions.

In this embodiment, a round-shaped slope 22 is formed between a second crowning 19 and an end face 2a of a slider main body 2A.

Here, the rounded slope in the claim corresponds to the rounded-shaped slope 22.

In the event that the slope 20 is formed into the straight-line shape as in the first embodiment, due to a mounting error in mounting a return guide 16 relative to the end face 2a of the slider main body 2A, an end portion of the slope 20 on the second crowning 19 side protrudes towards a rolling element raceway groove 10 side, compared to an inner circumferential surface of a direction turning path (an inner circumferential side circulation groove 17 of the return guide 16). Accordingly, there is a fear that rolling elements 3 which roll from the direction turning path towards an inclined portion 15 when the linear guide apparatus is driven at high speeds are brought into collision with the protruding portion.

By forming the round-shaped slope 22 as in this embodiment, however, even though a mounting error occurs in mounting the return guide 16 on the end face 2a of the slider main body 2A, since the end portion of the slope 22 on the second crowning 19 side does not protrude towards the rolling element raceway groove 10 side, compared to the inner circumferential surface of the direction turning path. Therefore, there is eliminated a portion where stress concentration occurs as a result of the rolling elements 3 which roll from the direction turning path towards the inclined portion 15 when the linear guide apparatus is driven at high speeds collide therewith, thereby making it possible to enhance the durability of the linear guide apparatus when it is driven at high speeds.

Third Embodiment

Figure 7:
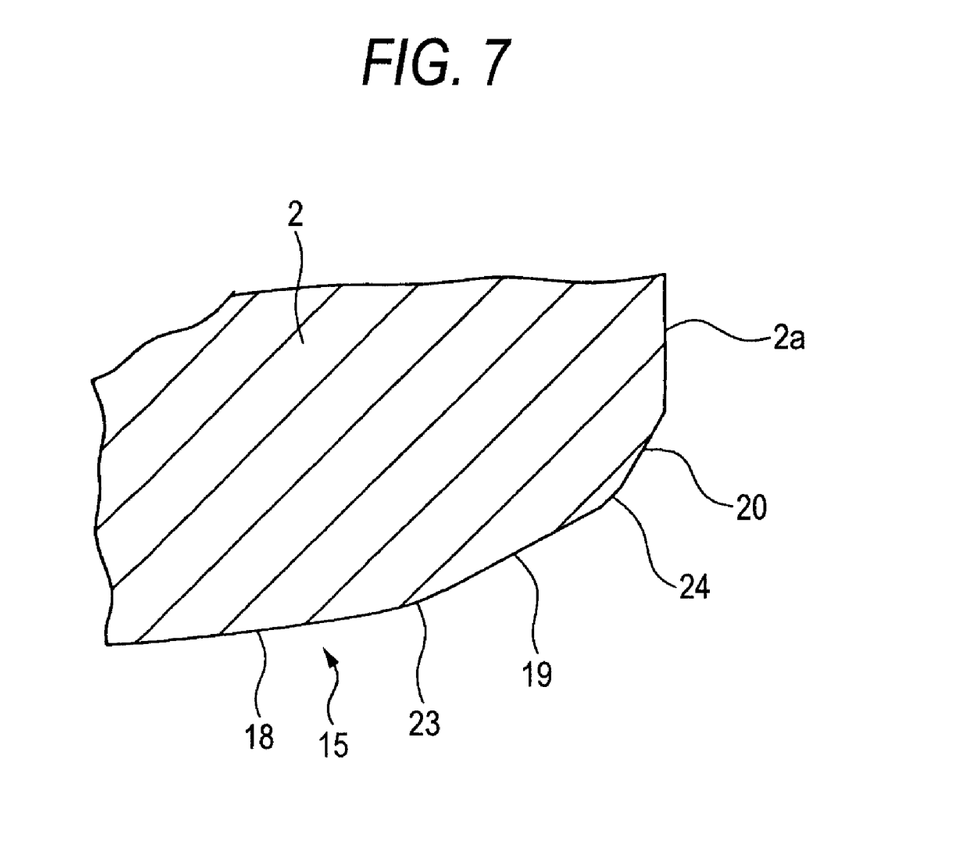
FIG. 7 is a sectional view showing a shape of an inclined portion of a third embodiment according to the invention.

Furthermore, FIG. 7 shows an inclined portion 15 of a third embodiment according to the invention in an enlarged fashion.

In this embodiment, a rounded portion 23 (a boundary portion between the first crowning and the second crowning being formed so as to be rounded) is formed between a first crowning 18 and a second crowning 19, and a rounded portion 24 (a boundary portion between the second crowning and the slope being formed so as to be rounded) is also formed between the second crowning 19 and a slope 20.

According to this embodiment, by forming the rounded portion between the first crowning 18 and the second crowning 19 and the rounded portion 24 between the second crowning 19 and the slope 20, since a location can be eliminated where rolling elements 3 which pass through the inclined portion 15 are brought into collision to produce a stress concentration, the component accuracy and mounting accuracy can be made stabler and the durability of the linear guide apparatus when it is driven at high speeds can be enhanced.

In addition, these rounded portions 23, 24 can easily be worked manually after the first crowning 18, the second crowning 19 and the slope 20 have been formed by mechanical grinding work.

Note that while FIGS. 1 and 2 show the construction in which the two rolling element rolling paths 14 are formed between each of the sides of the guide rail 1 and each of the arm portions 6 of the bearing block 2A, the gist of the invention is not limited thereto. Hence, even in the event that one or three or more rolling element rolling paths 14 are formed in the same way, the same function and advantage can be provided.

In addition, while in the embodiments, the balls are described as being used as the rolling elements 3, even in the event that "rollers" are used as the rolling elements, the same function and advantage can be provided.

While the invention has been described in connection with the exemplary embodiments, it will be obvious to those skilled in the art that various changes and modification may be made therein without departing from the present invention, and it is aimed, therefore, to cover in the appended claim all such changes and modifications as fall within the true spirit and scope of the present invention.

What is claimed is:

1. A linear guide apparatus comprising:
   a guide rail comprising a rail-side rolling element raceway groove which is formed thereon so as to extend along an axial direction of the guide rail;
   a slider main body comprising a slider-side rolling element raceway groove which faces the rail-side rolling element raceway groove;
   a plurality of rolling elements provided within a rolling element rolling path which is made up of the rail-side rolling element raceway groove and the slider-side rolling element raceway groove so that the slider main body is movably supported on the guide rail;
   a rolling element return path provided within the slider main body so as to extend parallel to the rolling element rolling path;
   end caps mounted, respectively, on both end faces of the slider main body in moving direction of the slider main body;
   direction turning paths formed by inner circumferential guide members which are disposed to be fixed, respectively, to the end faces of the slider main body so as to establish a communication between the rolling element rolling path and the rolling element return path; and
   inclined portions provided at both end portions of the slider-side rolling element raceway groove, wherein
   the inclined portions are each comprises:
      a curved first crowning which is formed to a large radius of curvature so as to be inclined moderately and continuously from the slider-side rolling element raceway groove;
      a straight-line second crowning which neighbors the first crowning and extends towards an inner circumferential surface of the direction turning path and which is steeper in inclination than the first crowning and shorter in axial length than the first crowning; and
      a slope which is provided between the second crowning and the end face of the slider main body and is formed steeper than the first and second crownings, and
   in a section taken along a direction in which the inclined portions and the rolling elements are brought into contact with each other, an intersection point between an imaginary line extending linearly along the second crowning and a linear imaginary line extending along the end face of the slider main body substantially coincides with an intersection point between an imaginary line extending in an arc-like fashion along an outer circumference of the inner circumferential guide member which makes up an inner circumferential surface of the direction turning path and the linear imaginary line extending along the end face of the slider main body.

2. The linear guide apparatus as set forth in claim 1, wherein
   the slope is formed so as to be rounded.

3. The linear guide apparatus as set forth in claim 1, wherein
   a boundary portion between the second crowning and the slope is formed so as to be rounded.

4. The linear guide apparatus as set forth in claim 1, wherein
   a boundary portion between the first crowning and the second crowning is formed so as to be rounded.

5. A linear guide apparatus comprising:
   a guide rail comprising a rail-side rolling element raceway groove which is formed thereon so as to extend along an axial direction of the guide rail;
   a slider main body comprising a slider-side rolling element raceway groove which faces the rail-side rolling element raceway groove;
   end caps mounted on both ends of the slider main body in moving direction thereof;
   inner circumferential guide members mounted on both ends of the slider main body in moving direction thereof within the end caps, respectively; and
   a plurality of rolling element which circulate in a rolling path comprising:
      a rolling element rolling path formed by the rail-side rolling element raceway groove and the slider-side rolling element raceway groove;
      a rolling element return path formed within the slider main body so as to extend parallel to the rolling element rolling path; and
      direction turning paths formed by the end caps and the inner circumferential guide members so as to communicate the rolling element rolling path with rolling element return path, wherein
   the slider-side rolling element raceway groove comprises inclined portions at both end portions thereof,
   the each inclined portions comprises:
      a curved first crowning which is continuous from the slider-side rolling element raceway groove in a curved fashion;
      a straight-line second crowning which extends towards an inner circumferential surface of the direction turning path from the first crowning and has an inclination angle larger than a maximum inclination angle of the first crowing and shorter in axial length than the first crowning; and
      a slope which is provided between the second crowning and the end face of the slider main body and of which inclination angle is larger than those of the first and second crownings, and
   in a section taken along a direction in which the inclined portions and the rolling elements are brought into contact with each other, an intersection point between an imaginary line extending linearly along the second crowning and a linear imaginary line extending along the end face of the slider main body substantially coincides with an intersection point between an imaginary line extending in an arc-like fashion along an outer circumference of the inner circumferential guide member which makes up an inner circumferential surface of the direction turning path and the linear imaginary line extending along the end face of the slider main body.

6. The linear guide apparatus as set forth in claim 5, wherein
the slope is formed so as to be rounded.

7. The linear guide apparatus as set forth in claim 5, wherein
a boundary portion between the second crowning and the slope is formed so as to be rounded.

8. The linear guide apparatus as set forth in claim 5, wherein
a boundary portion between the first crowning and the second crowning is formed so as to be rounded.

* * * * *